Patented Dec. 5, 1950

2,533,178

UNITED STATES PATENT OFFICE 2,533,178

α-(PHTHALIMIDOMETHYL - ANILINO)-AN-THRAQUINONES AND PROCESS OF PREPARING THE SAME

David I. Randall and Edgar E. Renfrew, Jr., Phillipsburg, N. J., assignors to General Aniline & Film Corporation, New York, N. Y., a corporation of Delaware No Drawing. Application May 1, 1948,
Serial No. 24,678

11 Claims. (Cl. 260—326)

The present invention relates to dyestuffs of the anthraquinone series and particularly to α-(phthalimidomethyl - anilino)-anthraquinones, phthalamic acid derivatives thereof, and to a method of preparing the same.

It is known that α-(phthalimidomethyl)-anthraquinone dyestuffs can be prepared by condensing methylolphthalimide with 1- or 2-hydroxyanthraquinone. Aminoanthraquinones and polyaminoanthraquinones do not undergo this condensation reaction.

It is also known that 1- and 1,5-phthalimidoanthraquinones can be prepared by treating a halogen derivative of anthraquinone with phthalimide in the presence of a copper catalyst, such as, for example, cupric chloride, and in the presence of an acid binding agent, such as, for example, sodium acetate and the like. Compounds of this type, which are usually yellow in color, are not particularly useful as dyestuffs because of their lack of stability.

We have now found that anthraquinones in which at least one of the α-positions bears a substituted anilino group readily react with methylolphthalimides to yield α-(phthalimidomethyl-anilino)-anthraquinones. These dyes are not only valuable as colorants and as pigments, but on base splitting to the phthalamic acid yield dyes which are also valuable as colorants in dyeing nylon, wool, and as pigments and ink bases.

It is an object of the present invention to provide α - (phthalimidomethyl - anilino) - anthraquinone dyestuffs.

A further object is to provide phthalamic acid derivatives from said dyestuffs by hydrolysis.

A still further object is to provide a process of preparing said dyestuffs and the hydrolysis products thereof.

Other objects and advantages will become apparent from the following description.

The above and other objects are accomplished by condensing an anthraquinone, in which at least one of the α-positions has a substituted anilino group, with a methylolphthalimide in the presence of sulfuric acid.

The group or groups present in the α-position of the anthraquinone nucleus contain nuclear substituents which are o- and p-directing and at least one of the positions ortho or para to such directing substituent being unsubstituted. As a consequence, during the condensation reaction one or two phthalimidomethyl groups are introduced into such unsubstituted positions of the anilino radicals.

In practicing the invention, a gram mole of an α-(substituted anilino)-anthraquinone is dissolved in 96% sulfuric acid at a temperature ranging from 10° C. to 30° C. and to the solution is added 1 to 8 molecular equivalents (in 6% molar excess) of a methylolphthalimide. The mixture is allowed to stand, preferably with stirring, for a period of time ranging from several hours to several days at a temperature between 20° to 30° C., preferably at room temperature, i. e., 20° C. The mixture is then poured over ice, the precipitate filtered off, washed several times with water and dried. The precipitated product may be used as such as a vat dyestuff or subjected to hydrolysis, as hereinafter described, to yield phthalamic acid anthraquinones.

The molecular equivalents of the methylolphthalimide to be employed will depend, of course, upon the number of substituted anilino groups in the anthraquinone nucleus and upon the number of the unoccupied ortho and para positions to the substituent group of the substituted anilino group, and upon the number of the phthalimidomethyl groups to be introduced into the phenyl ring of the substituted anilino group. For each anilino group, which is present in the α-positions of the anthraquinone nucleus, the maximum number of molecular equivalents (in 6% molar excess) of a methylolphthalimide to be employed corresponds to the sum of the available reactive positions. Thus, when two positions ortho to the substituent group in the anilino radical are unoccupied, two molecular equivalents (in 6% molar excess) are employed for each substituted anilino group. It is, therefore, possible to direct not only one, but two phthalimidomethyl groups into each one of the substituted anilino groups.

The α-(substituted anilino)-anthraquinones are readily prepared by condensing, in the usual way, an α-chlor- or α-bromanthraquinone with a substituted aniline in the presence of copper or copper salts and an acid binding agent, such as sodium bicarbonate.

The substituted anilines, which are condensed with an α-chlor- or α-bromanthraquinone, are as stated those containing o- and p-directing substituents, such as, for example, lower alkyl and alkoxy groups having from 1 to 4 carbon atoms, e. g., methyl, ethyl, propyl, butyl, methoxy, ethoxy, propoxy, etc.; aryloxy, e. g., phenoxy, methoxyphenoxy, p-methoxyphenoxy, p-phenoxyphenoxy, p-sulfophenoxy, etc.; aralkyl, e. g., benzyl, or o- and m-methylbenzyl; hydroxyl; lower hydroxyalkyl, e. g., methylol, α-hydroxypropanol, β-hydroxypropanol, etc., and halogen, especially chlorine and bromine.

As representative substituted anilines characterized by the above, the following may be mentioned:

o-Toluidine
p-Toluidine
p-Amino-phenol
2-chloro-p-anisidine
2-chloro-p-toluidine
2,3,4-trichloraniline
2-ethyl-p-toluidine
2,4-xylidine
2,5-xylidine
3,4-xylidine
p-Phenetidine
p-Anisidine
p-Phenoxyaniline
4-(p-aminophenoxy)-benzene sulfonic acid
4-aminodiphenylmethane
p-Aminobenzyl alcohol The α-(substituted anilino)-anthraquinones may be further substituted by amino, halogen, e. g., chlorine, or bromine, hydroxy, alkyl, methyl, ethyl, propyl, etc., carboxylic acid, sulfonic acid and the like. Such groups may appear in one or more or all of the positions unoccupied by the aforestated anilino groups.

As representative of α-(substituted anilino)-anthraquinones falling within the foregoing description reference may be made to the following:

1-amino-2-bromo-4-toluidinoanthraquinone
1 - (2'-methyl-5'-chloro)-anilinoanthraquinone-2-carboxylic acid
1,4-di-p-toluidinoanthraquinone
1,4,5,8-tetra-p-toluidinoanthraquinone
1 - amino - 4 - p - toluidinoanthraquinone - 2 - sulfonic acid
1 - amino - 4 - p - ethylanilinoanthraquinone-2-sulfonic acid
1 - amino - 4 - m - chloranilinoanthraquinone - 2-sulfonic acid
1 - amino - 6 - chloro - 4 - anilinoanthraquinone-2-sulfonic acid
1 - amino - 4 - anilinoanthraquinone - 2 - 5 - disulfonic acid
1,4 - di - p - toluidinoanthraquinone - 2,3 - dicarboxylic acid
1,4 - di - p - toluidino - 2,3 - dimethylanthraquinone The methylolphthalimides which may be employed are methylolphthalimide itself or substituted methylolphthalimides wherein one or more substituents may be present in the 3 to 6 positions of the benzene nucleus. Thus there are included such representative methylolphthalimides as:

N-methylol-3-methylphthalimide
N-methylol-4-methylphthalimide
N-methylol-4,5-dibromophthalimide
N-methylol-4-chlorophthalimide
N-methylol-3,4-dichlorophthalimide
N-methylol-3-nitrophthalimide
N-methylol-4-nitrophthalimide
N-methylol-5-aminophthalimide
N-methylol-6-aminophthalimide The methylolphthalimides are readily prepared by boiling formalin solution with a phthalimide.

Instead of employing a methylolphthalimide in the condensation reaction, molecular equivalents of a phthalimide and formaldehyde or a formaldehyde producing compound, such as paraformaldehyde, may be used.

Our invention will be more fully described in conjunction with the following specific examples. It should be understood, however, that the examples are given by way of illustration only and the invention is not to be limited by the details set forth herein.

*Example 1*

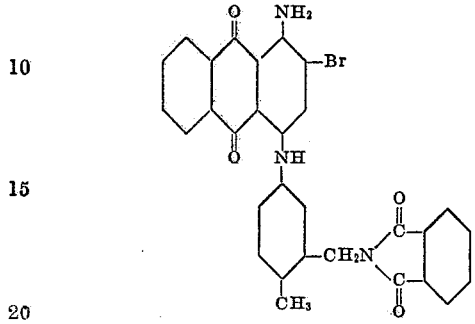

40.7 grams of 1-amino-2-4-toluidino-anthraquinone were dissolved in 175 cc. of 96% sulfuric acid at 20° C. To this solution 18.7 grams of methylolphthalimide (in 6% molar excess) were added and the solution allowed to stand at room temperature for 15 hours. The solution was then poured over ice and the blue precipitate filtered off. The yield of the dye, which is quantitative, was 58 grams with a melting point of 155°–167°.

The product dyes cellulose acetate from a hot soapy bath in blue shades.

*Example II*

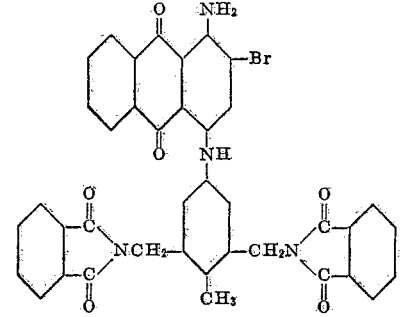

Example I was repeated with the exception that 37.4 grams instead of 18.7 grams of methylolphthalimide were employed. A quantitative yield of the di-condensation product was obtained, i. e., two phthalimidomethyl groups were introduced in the positions ortho to the methyl group of the p-toluidinoanthraquinone.

*Example III*

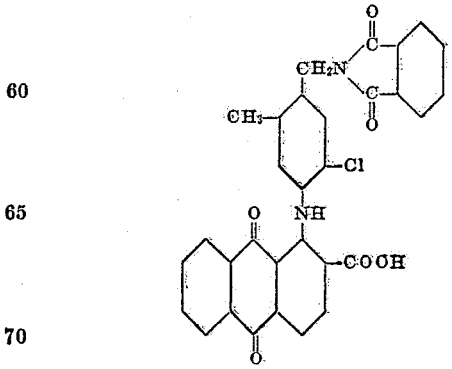

39 grams of 1-(2'-methyl-5'-chloro)-anilinoanthraquinone-2-carboxylic acid were dissolved in 200 cc. of 96% sulfuric acid at room temperature. To this solution 18.8 grams of methylolphthalimide were added while stirring and the solution allowed to stand for two days. By following the procedure in Example I, 52.5 grams (95%) of a red dye were obtained. The product dyes nylon and wool from a neutral or acid bath in red shades.

Example IV

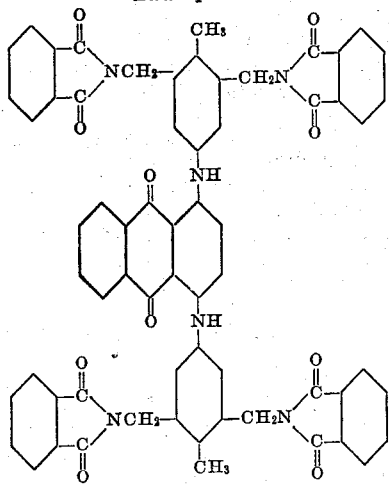

41.6 grams of 1,4-di-p-toluidinoanthraquinone were dissolved in 175 cc. of 96% sulfuric acid. To this solution 74.8 grams of methylolphthalimide were stirred in. The solution was stirred at 30° to 31° C. for 16 hours. By working up the reaction mixture as in Example I, 101 grams (97% based on tetra-substitution product) of a green pigment was obtained.

Example V

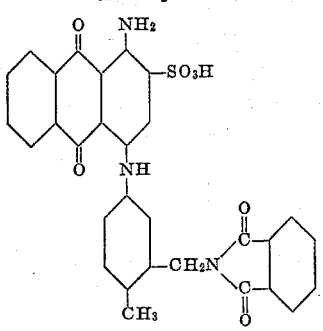

Example I was repeated with the exception that 40.8 grams of 1 - amino - 4 - p-toluidinoanthraquinone-2-sulfonic acid were substituted for 40.7 grams of 1-amino-2-bromo-4-toluidinoanthraquinone. The product isolated as in Example I dyes wool in blue shades.

Example VI

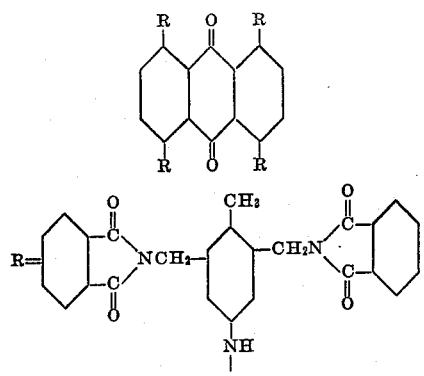

62.8 grams of 1,4,5,8-tetra-p-toluidinoanthraquinone were dissolved in 300 cc. of 98% sulfuric acid. To this solution 150 grams of methylolphthalimide were added with stirring and the stirring continued at a temperature ranging from 30° to 31° C. for 16 hours. By working up the reaction mixture as in Example I, 184.3 grams (97% based on an octa-substitution product) of a dark green pigment were obtained.

Example VII

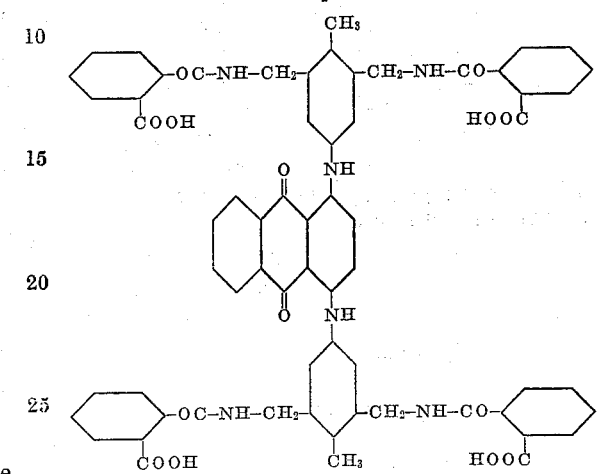

10 grams of the tetra-substitution product of Example IV in the form of a finely divided 10% paste were boiled for 2 hours with 500 cc. of a 10% potassium hydroxide solution. The hydrolyzed tetraphthalamic acid was obtained upon precipitation and was isolated by filtration.

The phthalamic acid derivatives are very useful for dyeing wool and nylon.

The compounds of Examples I to VI inclusive were also hydrolyzed by the procedure of the foregoing example to yield phthalamic acid derivatives.

While we have disclosed the preferred embodiments of our invention and the preferred modes of carrying the same into effect, it will be readily apparent to those skilled in the art that many variations may be made therein without departing from the spirit thereof. Accordingly, the scope of our invention is to be limited solely by the following claims.

We claim:

1. An anthraquinone dyestuff in which at least one of the α-positions of the anthraquinone ring is joined by an amino group to a phenyl radical containing a substituent selected from the class consisting of lower alkyl, lower alkoxy, aryloxy, halogen, hydroxy, and lower hydroxyalkyl, and further substituted in a position selected from the class consisting of ortho and para to such substituent by a member of the group consisting of phthalimidomethyl and o-carboxybenzoylaminomethyl.

2. An anthraquinone dyestuff characterized by the following formula:

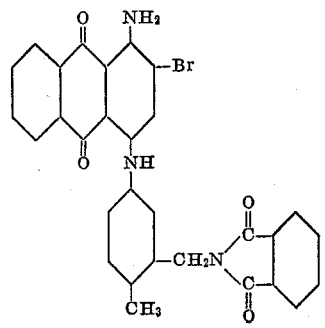

3. An anthraquinone dyestuff characterized by the following formula:

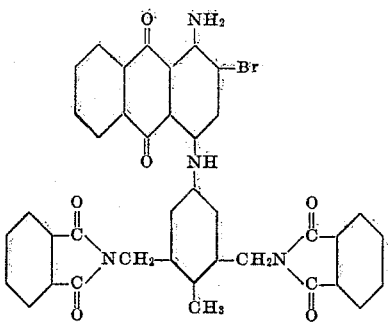

4. An anthraquinone dyestuff characterized by the following formula:

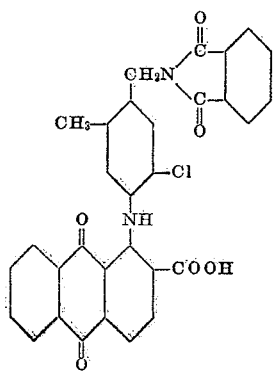

5. The process of preparing anthraquinone dyestuffs which comprises condensing, in the presence of sulfuric acid, an N-methylolphthalimide with a compound containing an anthraquinone nucleus of which at least one of the α-positions is joined by an amino group to a phenyl ring bearing a substituent selected from the class consisting of lower alkyl, lower alkoxy, aralkyl, aryloxy, halogen, hydroxy and lower hydroxyalkyl, said substituents are o- and p-directing, and at least one of the positions otho and para to such a substituent is unsubstituted.

6. The process of preparing an anthraquinone dyestuff which comprises condensing, in the presence of sulfuric acid, one mole of methylolphthalimide with one mole of 1-amino-2-bromo-4-toluidinoanthraquinone.

7. The process of preparing an anthraquinone dyestuff which comprises condensing, in the presence of sulfuric acid, two moles of methylolphthalimide with one mole of 1-amino-2-bromo-4-toluidinoanthraquinone.

8. The process of preparing an anthraquinone dyestuff which comprises condensing, in the presence of sulfuric acid, one mole of methylolphthalimide with one mole of 1-(2'-methyl-5'-chloro)-anilinoanthraquinone - 2 - carboxylic acid.

9. The process according to claim 6, wherein the condensation reaction is conducted at room temperature.

10. The process according to claim 7, wherein the condensation reaction is conducted at room temperature.

11. The process according to claim 8, wherein the condensation reaction is conducted at room temperature.

DAVID I. RANDALL.
EDGAR E. RENFREW, Jr.

REFERENCES CITED

The following references are of record in the file of this patent:

UNITED STATES PATENTS

| Number | Name | Date |
|---|---|---|
| 1,917,801 | Kunz et al. | July 11, 1933 |
| 2,245,780 | Heinrich | June 17, 1941 |
| 2,335,680 | Klein | Nov. 30, 1943 |
| 2,340,528 | Haack | Feb. 1, 1944 |